(12) United States Patent
Dies

(10) Patent No.: US 9,015,156 B2
(45) Date of Patent: Apr. 21, 2015

(54) INTERACTIVE COMPUTING RECOMMENDATION FACILITY WITH LEARNING BASED ON USER FEEDBACK AND INTERACTION

(71) Applicant: Percolate Industries, Inc., New York, NY (US)

(72) Inventor: Erik Dies, Brooklyn, NY (US)

(73) Assignee: Percolate Industries, Inc., New York, NY (US)

( * ) Notice: Subject to any disclaimer, the term of this patent is extended or adjusted under 35 U.S.C. 154(b) by 160 days.

(21) Appl. No.: 13/843,272

(22) Filed: Mar. 15, 2013

(65) Prior Publication Data

US 2014/0122456 A1    May 1, 2014

Related U.S. Application Data

(60) Provisional application No. 61/617,935, filed on Mar. 30, 2012, provisional application No. 61/707,532, filed on Sep. 28, 2012, provisional application No. 61/725,867, filed on Nov. 13, 2012, provisional application No. 61/707,503, filed on Sep. 28, 2012, provisional application No. 61/725,860, filed on Nov. 13, 2012, provisional application No. 61/725,895, filed on Nov. 13, 2012.

(51) Int. Cl.
*G06F 7/00* (2006.01)
*G06F 17/30* (2006.01)

(52) U.S. Cl.
CPC .... *G06F 17/30707* (2013.01); *G06F 17/30864* (2013.01); *G06F 17/3053* (2013.01)

(58) Field of Classification Search
USPC .................................................. 707/728, 737
See application file for complete search history.

*Primary Examiner* — Truong Vo
(74) *Attorney, Agent, or Firm* — Anotonio Papageorgiou, Esq.; Meister Seelig & Fein LLP

(57) ABSTRACT

The present application provides a method for content ranking for recommending content to a community of users. Recommending content to a community of users is provided by identifying data sources associated with a user of the recommendation system. Each data source comprises content items. Hyperlinks embedded in the content items from the data sources associated with the user are extracted. The hyperlinks and a set of user preferences are used to rank new time-sensitive content items associated with a plurality of data sources. A set of ranked time sensitive customized content items are presented to the user as recommended content.

17 Claims, 12 Drawing Sheets

INTERACTIVE COMPUTING RECOMMENDATION FACILITY WITH LEARNING BASED ON USER FEEDBACK AND INTERACTION

RELATED APPLICATION

This application claims the benefit of U.S. Provisional Application Ser. No. 61/617,935 filed Mar. 30, 2012, entitled "Interactive Computing Recommendation Facility with Learning Based on User Feedback and Interaction"; U.S. Provisional Application No. 61/707,532 filed Sep. 28, 2012 entitled "Hashtable Comparator"; U.S. Provisional Application No. 61/725,867 filed Nov. 13, 2012 entitled "Hashtable Comparator"; U.S. Provisional Application No. 61/725,860 filed Sep. 28, 2012 entitled "Headline Similarity Comparator"; U.S. Provisional Application No. 61/725,860 filed Nov. 13, 2012 entitled "Headline Similarity Comparator" and U.S. Provisional Application No. 61/725,895, filed Nov. 13, 2012, entitled "Content Creation and Management System", which are hereby incorporated by reference.

FIELD OF INVENTION

The present application is related to content recommendation systems and more particularly to recommendation systems that recommend content originating from a given set of content sources.

BACKGROUND

Content management and filtration needed by any individual or entity that has an influx of content greater than they can reasonably consume. This is true of individuals or entities subscribing to many different sources of information and news on the Internet. Typically, the articles are presented to subscribers a rate that is greater than one person can read. This requires that the content presented be filtered in some way. Current approaches to recommending content include presentation of content based on reverse chronological order, human editor selected content, topic based recommendations, content scoring, and user ratings assigned to content. Examples of such can be seen in U.S. Pat. No. 7,958,066 and U.S. Pat. No. 8,032,480, each of which is incorporated by reference herein. Among other drawbacks, the above-described methods produce recommendations in a manner that are inefficient and time-consuming. Accordingly, there is a need for a recommendation system that is not so limited.

SUMMARY

The present application provides a method for recommending content to a community of users. In one aspect of the application, recommending content to a user is provided by identifying a plurality of data sources associated with a plurality of users of the recommendation system. Each data source comprises at least one content item. The content items from the plurality of data sources are compiled into a set of first content items. A set of first identifying data is extracted from the set of first content items. The identifying may comprise data hyperlink, a hashtag, and a key word. At least one data source associated with a particular user is identified. Content items from the data sources associated with the particular user form a set of second content items. Identifying data is extracted from the set of second content items. The content items in the first set of content items and the second set of content items are scored using similarity score based on the identifying data associated with the content items. Content items from the first set of content items and the second set of content items exceeding a pre-determined threshold are compiled into a set of third content items. The content items in the set of third content items are scored using an algorithmic scoring. The algorithmic score for each content item is based on the set of first identifying data and a set of preference parameters received from the particular user. The preference parameters may comprise a user preference, i.e. an interest theme determined by a survey or questionnaire from the particular user; a publishing behavior with regard to a data source; source popularity; or an age of a hyperlink. Using the algorithmic score, content items from the set of third content items are ranked and presented to the particular user. Hyperlinks to the ranked content items with context and/or a category or media associated with the ranked content item may also be presented to the particular user. In one embodiment, only a subset of the ranked content items is presented to the user.

In one embodiment, once the ranked content items are presented to the user, the user's interaction with the ranked content is monitored. The monitored user interactions may be fed back to the scoring algorithm to affect the content items that are presented to the user in the next session. A positive feedback regarding the ranked content items may allow for more content to be presented from the data source comprising the ranked content. The monitored user interactions may also be used to adjust the weight assigned to the ranked content item.

In certain embodiments, determining the similarity score entails determining the similarity between two content items based on their identifying data, i.e. two strings, by sorting the features (most common words) of those strings into predefined classes (which can be semantic) and performing measures on those classes. A final similarity measure is calculated as a weighted combination or the measure on individual classes.

The similarity scoring is provided by processing a first content string from a first document to identify a first set of one or more words associated with said first content string and processing a second content string from a second document to identify a second set of one or more words associated with said second content string. A reference set of classes for classifying words is defined from the first content string and second content string. Both said first set of one or more word and the second set of one or more words are classified into a first set of classes and a second set of classes respectively taken from the reference set of classes. The first set of classes and second set of classes, in some instances, may correspond to English and non-English words. A first class similarity score is computed using a comparator by comparing words from said first set of one or more words and said second set of one or more words which fall in a common first class in said reference set of classes. A second class similarity score is computed for any other words from said first set of one or more words and the second set of one or more words which fall in a second separate common class to determine a plurality of common class similarity scores. The common class similarity scores are weighted based on a predetermined class weight score, and a final similarity score between the first content string and the second content string based on summing the weighted common class similarity scores. In some instances, a subsample of content from the first document and the second document are used to derive said final similarity score, wherein the subsample may be a headline provided for a news story.

In certain embodiments, the comparator used in similarity scoring may be a hashtable comparator. The hashtable comparator compares two items, such as document sentences. This is done preferably by breaking down the sentences into features (words or phrases) and then using a hash table with keys corresponding to the words. The keys contain values for each sentence containing the word/phrases, and each sentence found for a particular key is then compared pairwise across all keys.

The hashtable comparator compares two items by processing n content strings from a plurality of document to identify a corresponding set of words associated with each of said plurality of content strings. A set of m keys in a hashtable is defined based on combining all of said set of words for said n content strings, wherein a key is created in said hashtable for each word in said combined set of words and each key, and each key is associated with one or more content string identification codes. The hashtable is reduced by eliminating a selected number (s) of keys based on a count of said identification codes. The remaining m-s keys in said hashtable are compared to compute sums for each combination of sentences found in said m-s keys. And, any of said sums of combinations of sentences which meet or exceed a predetermined threshold are stored in a second hashtable. In some instances, the sums to identify a pair of the n content strings having a greatest similarity score are sorted. Also, a first content string may be specified as a reference string comprised of a reference set of words. A document search can be performed with a search engine query based on said reference set of words to identify an initial candidate set of documents containing said n content strings, and each of said initial candidate set of documents can be processed to identify a highest ranking document having a similarity score closest to said first content string

DETAILED DESCRIPTION

The present application generally relates to systems and methods for the automated recommendation and/or discovery of time-sensitive content that is deemed by the system most relevant and interesting to a user. Embodiments of the application may be generally implemented in software and hardware computer systems, using combinations of both server-side and client-side hardware and software components, to provide a system and method for discovering time-sensitive content that is relevant and interesting to a user. The system may be embodied in a variety of different types of hardware and software as is readily understood by those of skill in the art.

Figure 1A:
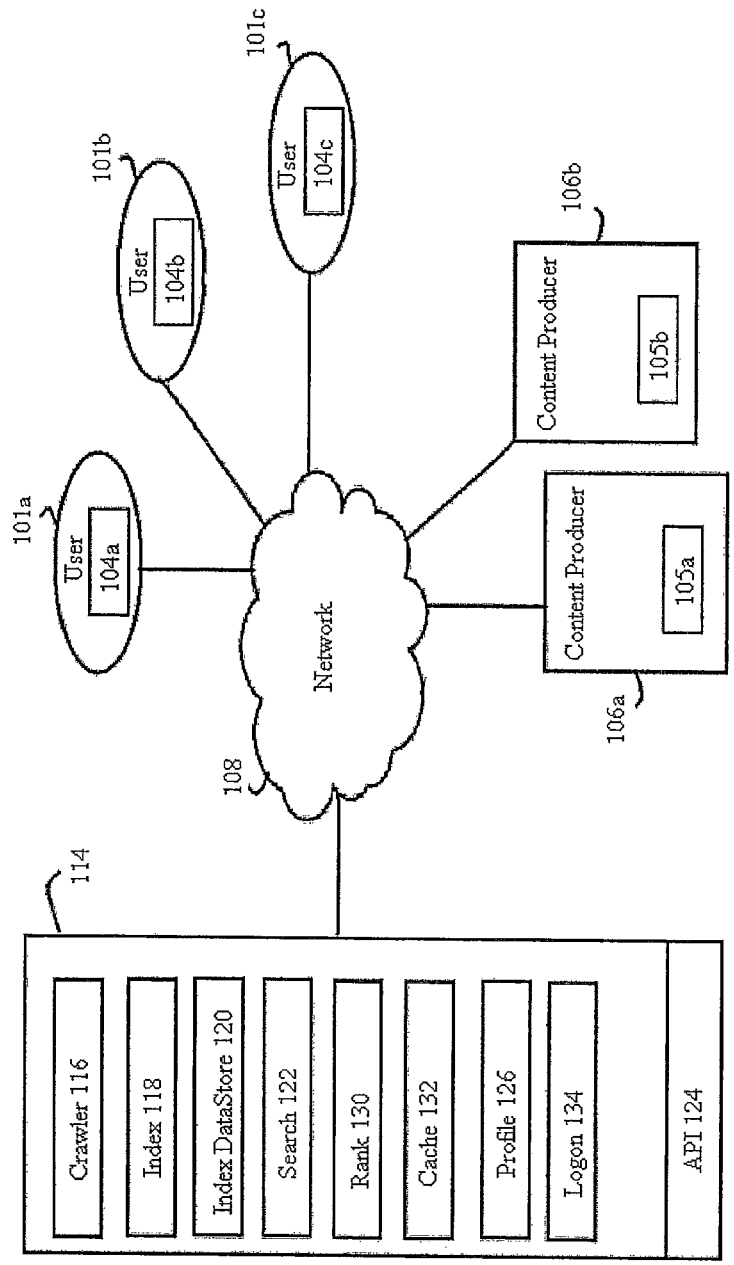
FIG. 1a is a block diagram illustrating a system for automated recommendation system for discovery of time-sensitive content that is relevant to a user.

FIG. 1a illustrates a system for discovering time-sensitive content that is deemed by the system relevant to a user. The system generally includes at least one computing device operable to perform the steps or otherwise provide the functionality discussed herein. In one embodiment, the system includes at least one server computer 114 coupled over a network 108 to one or more client device 101a-101c. According to one embodiment, a user interacts with a client workstation 101a, 101b and 101c. Client device may be a personal computer of the type that is well known to those of skill in the art and may include (not pictured) a processor, transient memory (e.g., RAM), persistent memory (e.g., hard drive), input device (e.g., mouse and keyboard) and circuitry to provide communication paths between the components. Other clients include, but are not limited to, PDAs, cellular devices, thin clients, etc.

A given client device 101a, 101b and 101c may comprise network interface hardware and software that provides the client with the ability to transmit and receive data over a network 108. The network 108 may be a local area network, a wide area network, or combinations thereof, e.g., the Internet, and provide communication channels between the clients 101a, 101b and 101c, content producer computers 106a and 106b, recommendation system computers 114, and other information sources.

The one or more content producers 106a and 106b host content items 105a and 105b accessible to clients 101a, 101b and 101c, over the network 108. A content item may contain one or more content item units, e.g., text, graphics, audio, video, etc. As used herein, the term content item refers to any set of content item units that is/are identifiable by a unique location or address (e.g., a URL). A client 101a, 101b and 101c, uses a client application 104a, 104b and 104c, such as a web browser, to issue a request for a content item to a content producer 106a and 106b by providing an address for the content item. The client application 104a, 104b and 104c receives the content item 105a and 105b that is responsive to the request and renders the content that is contained in or pointed to by the content item. For example, where a browser running on a client requests a web page from a web server, the browser receives the requested page and renders the content in the page, as well as the other interface screens discussed herein, which may include links to download and render content items from other web sites.

Due to the vast number of content items located on the Internet, it is increasingly difficult to locate content items of interest in a time sensitive manner. A recommendation system 114 provides a mechanism that provides clients content items of interest that are time sensitive and preferably most relevant to the clients or the client's interests. A recommendation system 114 may comprise a crawler component 116, an indexer component 118, an index data store 120, a search component 122, a ranking component 130, a cache 132, a profile data store 126 to provide persistent storage for one or more user profiles 128, a logon component 134, and an API 124 that the components 116, 118, 122, 130, 132 and 134 may use to execute functions for storage, retrieval and manipulation of data in the index data store 120 and profile data store 126. It should be noted that the recommendation system 114 and its constituent components and data stores may be deployed across the network 108 in a distributed manner whereby key components may be duplicated and strategically placed throughout the network 108 for increased performance, e.g., close to the edges of the network.

The recommendation system 114 comprises a crawler component 116 that is operative to open a communications channel with a content producer 106a and 106b (also referred to herein as a data source) over the network 108. The crawler 116 retrieves content items 105a and 105b from the content producers 106a and 106b and may store a copy of the content item in a cache 132 at the recommendation system 114. The cache 132 is a data structure that a persistent storage device maintains for the storage of content items, as is known to those of skill in the art. The crawler component 116 may also follow links to other content items that a given content item 105a and 105b references, navigating to the referenced content item and saving a copy of the content item in the cache 132, and so forth. Preferably, the crawler component 116 retrieves content items from a plurality of content producers 106a and 106b in a substantially simultaneous manner so as to collect content items 105a and 105b from the greatest number of content producers 106a and 106b in the least amount of time.

In addition to using the crawler component 116 to collect content items 105a and 105b from over the network 108, the recommendation system 114 may also collect information on individual users by monitoring user interaction with client applications 104a, 104b, and 104c, content servers 106a and 106b, the recommendation system 114 and other information sources made available over the network 108. The recommendation system 114 may collect information according to a number of techniques.

Alternatively, a client application 104d and 104e may be in communication with a proxy server 112. Data traffic from the client 101d and 101e passes through the proxy server 112 prior to receipt by the component to which the data is addressed, e.g., content producer 106a and 106b. The proxy server 112 may record information from the stream of data traffic transmitted and received by the client application 104d and 104e. The proxy server 112 may further aggregate this information from a plurality of connected clients 101d and 101e and periodically transmit the information to the recommendation system 114. Where the client application 104a and 104b employs neither a plug-in 128 nor transmits and receives information through a proxy server 112, the recommendation system 114 may directly collect information from the stream of data that the client application transmits and receives. For example, where the search provider maintains a suitably large collection of content items in the cache 132, the user may browse though content items from the cache 132 as opposed to browsing the content item from its source location 106a and 106b, allowing the recommendation system 114 to observe information in the data stream. Similarly, the recommendation system 114 may provide the user with one or more controls that allow for saving content items to the cache 132.

In addition, the recommendation system 114 may provide advanced functionality that allows a user to perform one or more actions upon content items 105a and 105b that the user browses. The recommendation system 114 comprises an API 124 that exposes functions for allowing the user to personalize content items and the content contained within content items, such as saving, tagging, annotating, etc., as well as maintain a user's navigation history, which is referred to herein as personalization. Personalization actions that the API 124 provides include, but are not limited to, saving copies of content items, tagging content items, annotating content items, and performing other actions, e.g., highlighting content in a content item. The recommendation system 114 comprises a login component 134 that provides authentication of a user's credentials, thereby providing access to personalized information for the user, e.g., a profile, which may include a portion of dedicated persistent storage space. Credentials that the user provides to the login component 134 may comprise a username/password pair, a physical token, a biometric identifier, or other identification credentials known to those of skill in the art.

Regardless of the specific manner in which the recommendation system 114 receives information regarding the use of the client application 104a, 104b and 104c, the recommendation system 114 creates a profile 128 for each user of a client application 104a, 104b and 104c with which the recommendation system 114 is in communication for the storage of personalized information. The recommendation system 114 generates one or more user profiles 128 that organize and provide a given user with access to his or her personalized information, as well as allow the recommendation system 114 to leverage the personalized information in indexing, searching and ranking of content items, thereby enhancing the relevance of items.

Figure 1B:
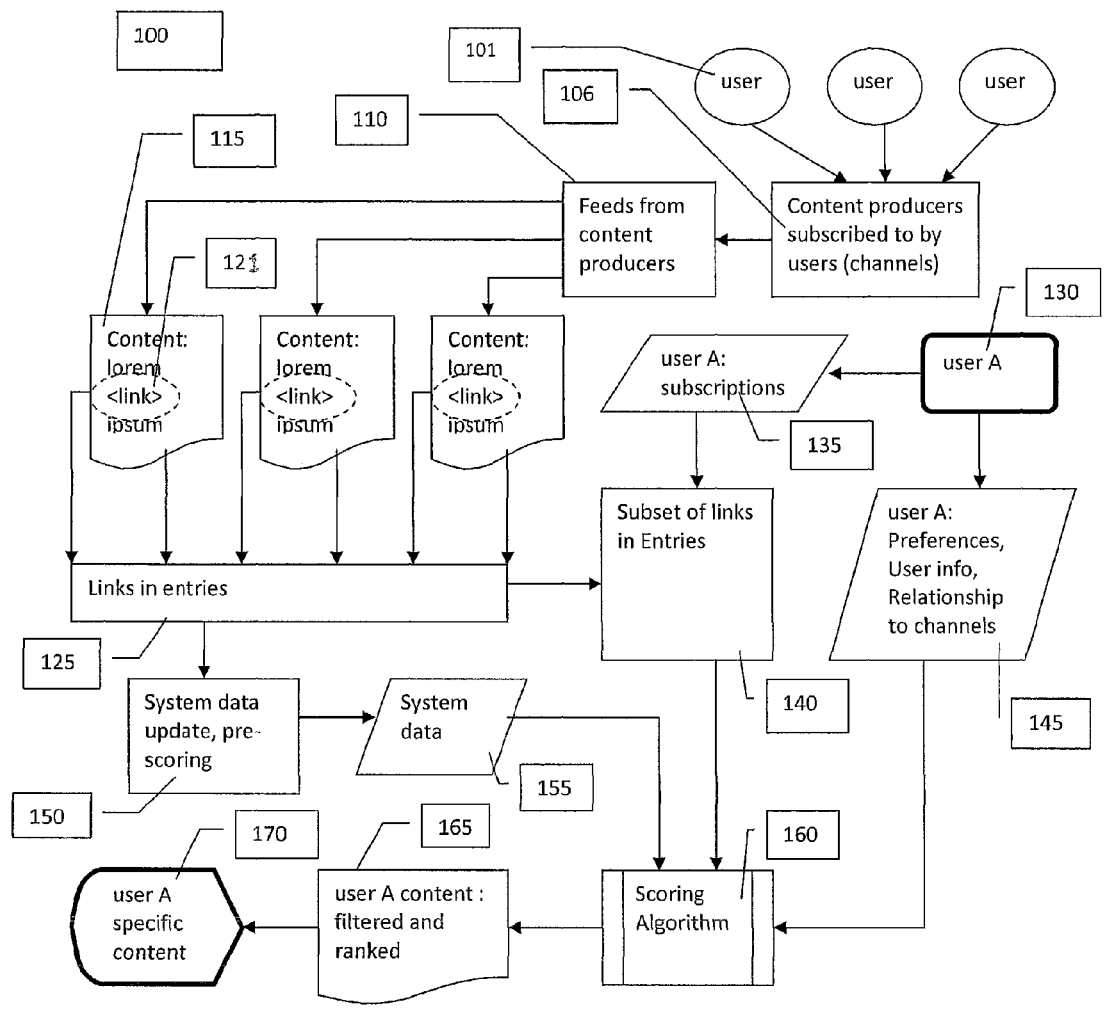
FIG. 1b is block diagram illustrating a method for scoring and sorting time sensitive content based on the user of references.
Figure 2:
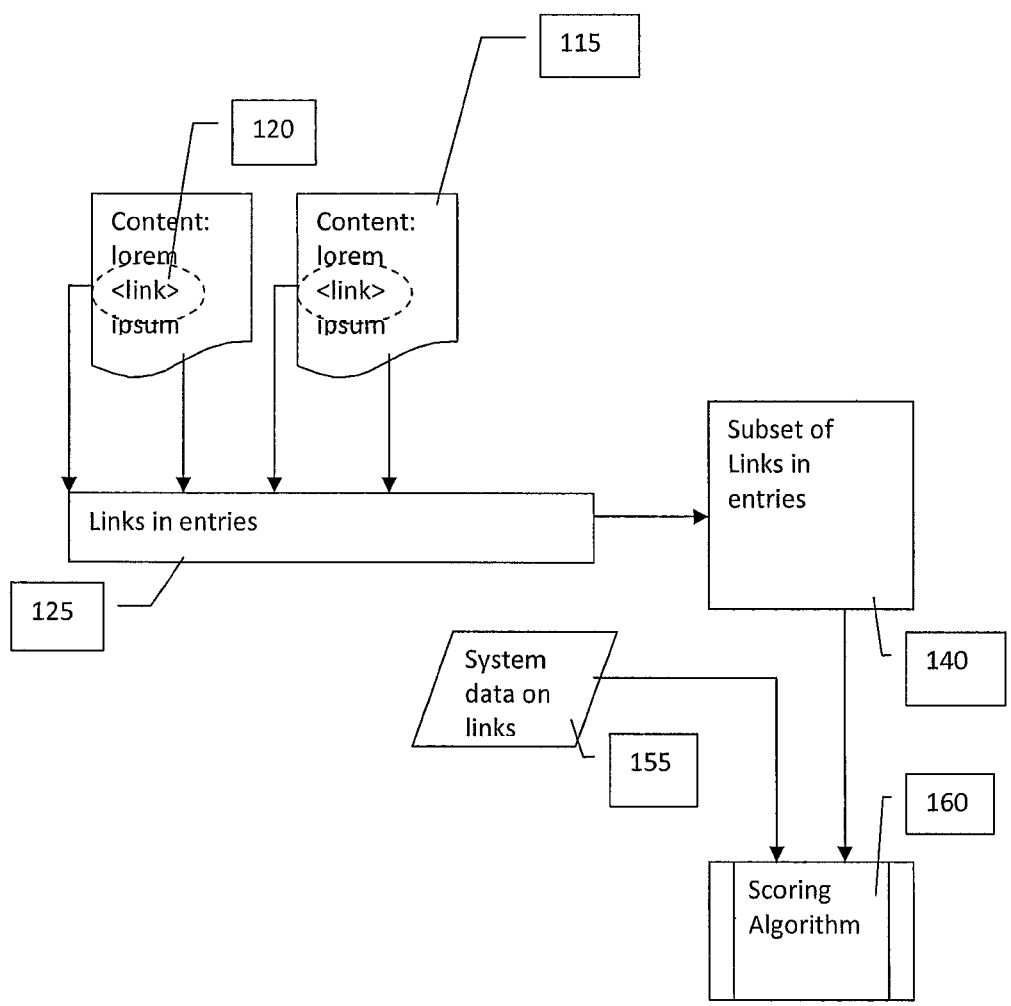
FIG. 2 is block diagram illustrating a method of reference based scoring.

FIG. 1b illustrates the interplay between various components of the automated recommendation system. A body of information is preferably created and found in subscriptions, feeds, friends, social networking pages etc. of a user on a plurality of content producer's website 106a and 106b, which are searched for relevant content items and then examined and ranked as discussed herein with reference to FIG. 2. It will be understood that these are but examples, and that other data sources could be mined, searched, etc. Preferably, a subset of the ranked content items is then presented to the user, allowing the user to add context to if the user so chooses. The user's interaction with the system is also preferably monitored and used to improve the ranking of content items.

As seen in FIG. 1b, users 101 of the recommendation system preferably identify the content producers they subscribe to at step 106, although it will be understood that this can be automatically determined in some instances. The content producers preferably include, but are not limited to, RSS and twitter feeds as discussed above. These feeds are collected as content or data sources in a first computing system 110 referred to hereafter as the recommendation system, which preferably supports the operations of a website that allows users to interface with the recommendation system. The website preferably offers customized, tailored content consumption for a community of users in accordance with the present teachings.

The content items of these content sources 115 are read and parsed or "scraped" by the system for, among other things, hyperlinks 121 embedded therein. These links found in the content item 125 are recorded along with a record of where the content item and/or the link came from, and other data. For example, the content item may be a feed from an apparel company, which includes a link to the company's line of spring apparel. In this instance, the system would record link and the name of the apparel company and/or the source of the link in association with the link. While hyperlinks are discussed herein, it will be understood that other forms of data or metadata could be extracted from the content items and/or from the sources, including for example, hashtags, keywords, etc.

The internet content of each recorded hyperlink is preprocessed to classify the hyperlinks in (1) relative terms, with regard to internet content of the other hyperlinks, and (2) empirical terms, with regard to categorical classification, based only on a limited portion or sample of the internet content of the hyperlinks at step 125. When classifying the hyperlinks in relative terms, the recorded hyperlinks can be matched with hyperlinks that were recorded previously and/or are from content sources that the user does not subscribe to. The classification of the recorded hyperlink creates a set of first content items.

In a preferred embodiment, the classification of the content of each hyperlink is based on a title or description given to the content, so as to accelerate the classification process. It will be understood that other forms of content sub-sampling or content signature analysis could be used in some instances to derive a similar metric with equivalent speed and accuracy.

In a preferred embodiment, a similarity score is determined for two or more pieces of internet content based on their respective text of the content. The hyperlinks related to the pieces of internet content that have a similarity score above a pre-determined threshold, are grouped together to create a subset of relevant internet content. The hyperlinks related to each of the pieces of internet content in the subset are recorded as a subset of relevant hyperlinks, at step 140.

At a later time, a user 130 visits his or her customized user page 170, which preferably presents time-sensitive content items customized for such user. To do this, the set of first content items 140 are intersected with a set of second content items. The set of second content items are content items from content sources subscribed to by the particular user. The system searches for matches between the set of first content items and the second set of content items. The links to the matched content items could be recommended to the user. The user's preferences with respect to content and its source 145 are then preferably combined with these links 140 and system-wide data 155 by an algorithmic scoring process 160. The user's preferences are gathered manually through an administrator or via surveys, questionnaires and input. The user's preferences help determine an interest theme or target audiences. The resulting ranked content is then prepared for presentation 165 and presented to the user 170.

The subscriptions from different content sources, herein called channels, are stored for all the users in the recommendation system. The term 'channel' and the term 'source' are used interchangeably and are the system 100 abstraction of any source of content items that can be filtered. In one embodiment, discovery of additional channels can also be done through automated tools. Periodically, any and all new content items from all the channels are examined through a scrapping process. The process for which is discussed in relation to FIG. 3.

Figure 3:
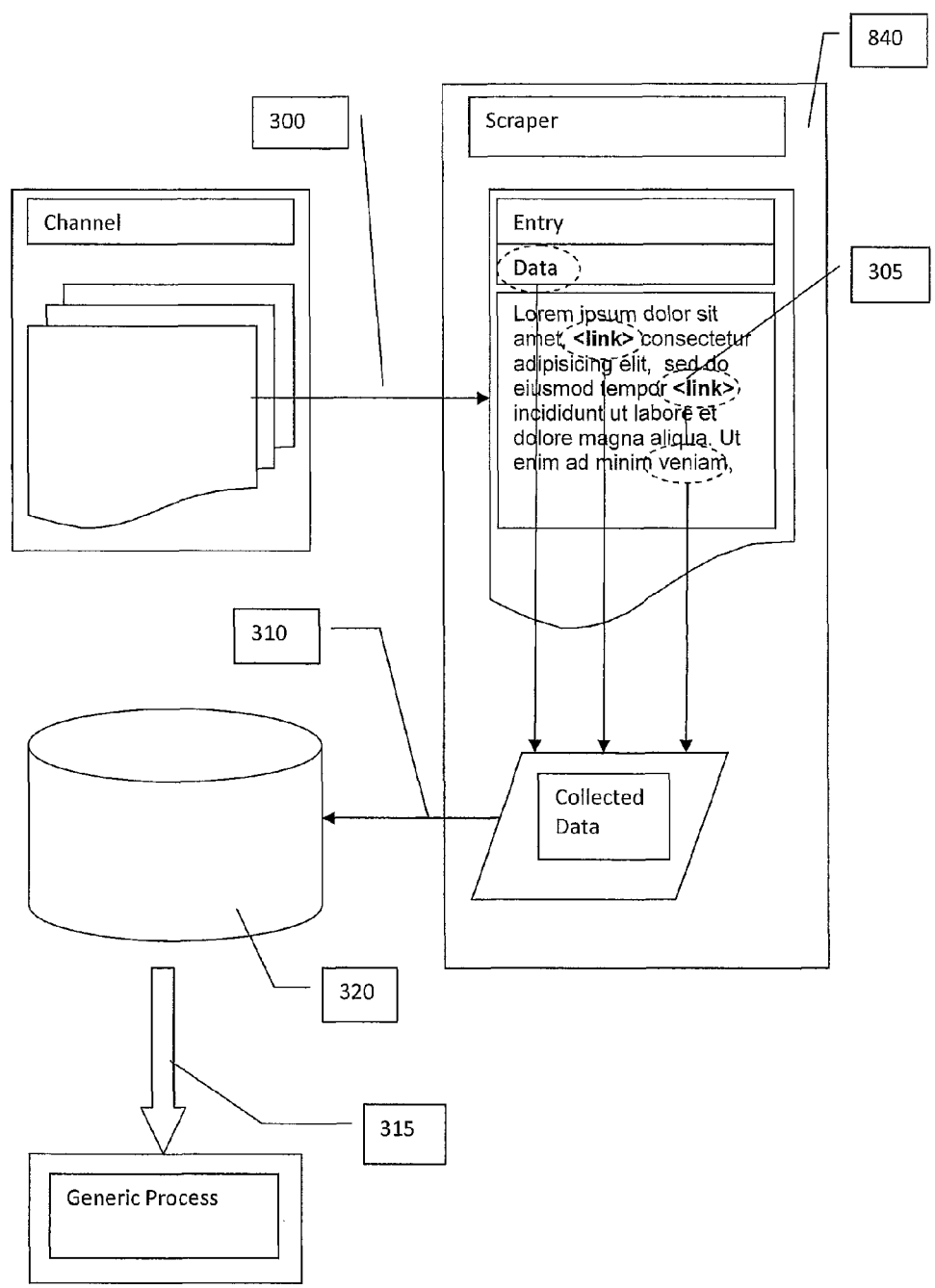
FIG. 3 is a block diagram illustrating scraping information from a webpage.

FIG. 3 describes scraping of content items. Content items from the plurality of channels are collected at 300 in accordance with any desired system requirement timetable, e.g. hourly or daily. In one embodiment, the content items from the plurality of channels are collected in real time. All relevant information about the content items, including text, images, time published, length, source, and embedded hyperlinks, is scraped or parsed at 305. The new pieces of content items called entries, the data for these entries, and hyperlinks embedded in the entries are preferably stored in system 310 and/or some other accessible storage system. This information 315 can be retrieved later by the recommendation system.

Figure 4:
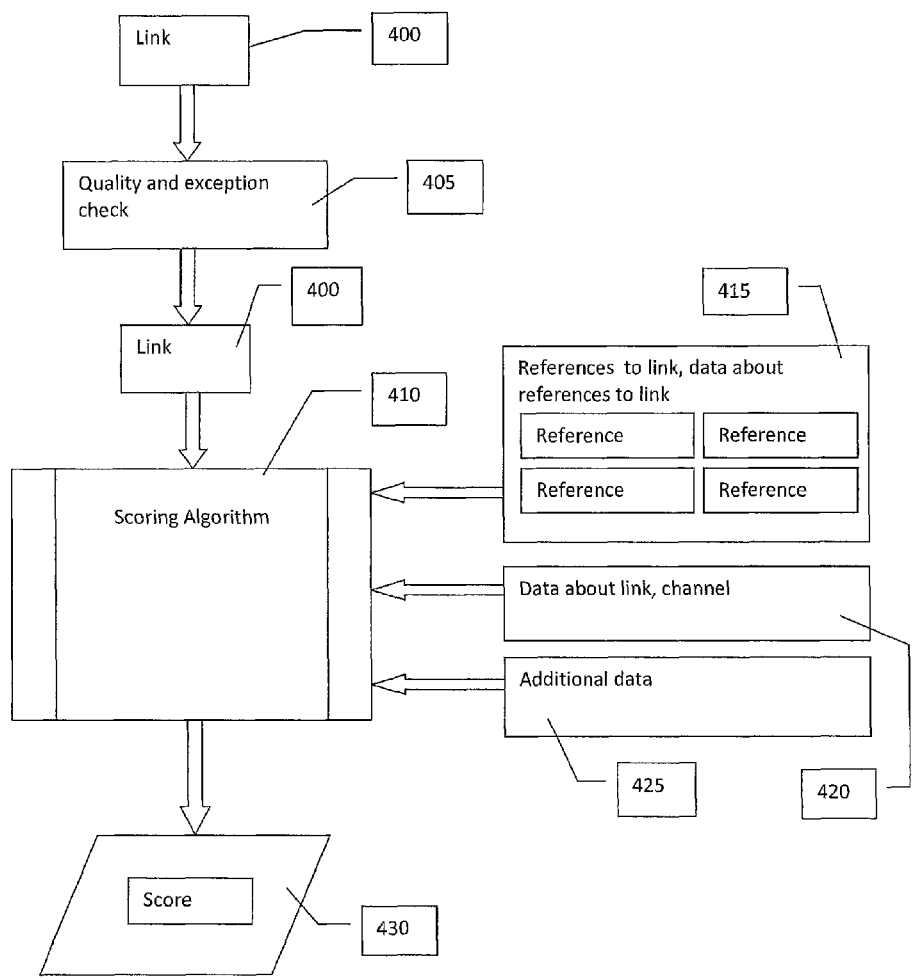
FIG. 4 is a block diagram illustrating an algorithmic scoring of content.

FIG. 4 illustrates the algorithmic scoring of content. The links 400 are processed to insure that they are of proper quality 405, e.g. preferably not spam, other irrelevant content, and scored algorithmically 410. Examples of factors considered by the scoring algorithm 410 include any entries that reference the link and all accompanying data 415, system wide data, including but not limited to the user's preferences, the publishing behavior of the channel, the number of people in the recommendation system who subscribe to the channel, an age of the link 420, and other data 425 of interest. A score 430 is then generated and returned by which the content can be ranked.

For example, links coming from the entries published by the channels that a user subscribes to are collected. The user's preferences with respect to the channels they subscribe to are also preferably collected. These are combined in the scoring algorithm to rank the links in order of estimated relevance to the user. These links (and parts or all of their related content if desired) are then presented to the user. The user interface and the manner of the presentation is expected to vary significantly from platform to platform.

Figure 5:
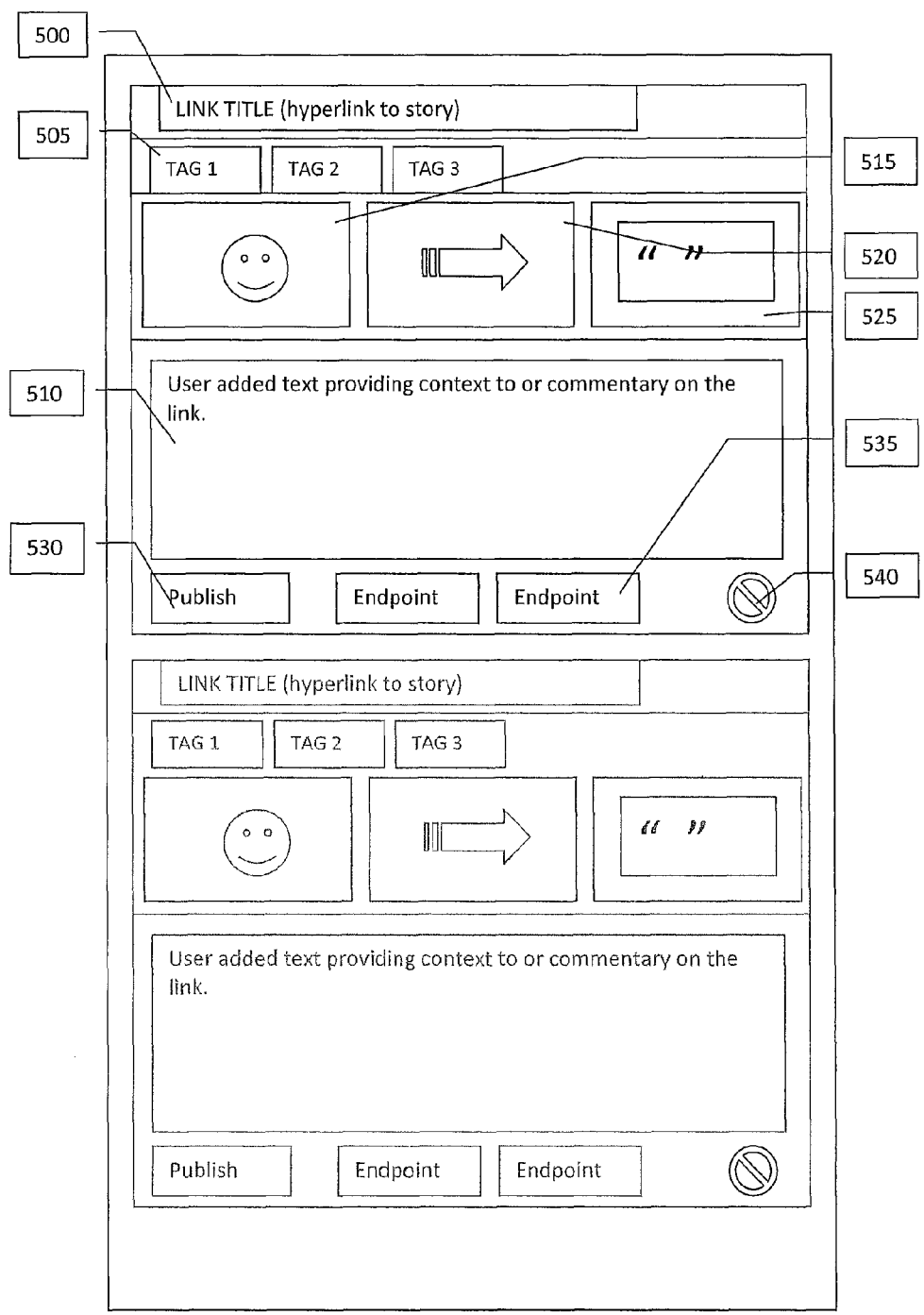
FIG. 5 is an example of a user interface for presenting filtered content to be contextualized and published.

The user may then interact with the content items as shown in FIG. 5. Examples of this interaction include but are not limited to: publishing the link with context, publishing the link with any associated categories or media, marking the link as not interesting to them, or marking the link as something they don't want to see in the future. Other types of interactions can be monitored as well, and it will be understood that these are merely exemplary. These user interactions are monitored, logged and then coupled with machine learning techniques to adjust the algorithm and affect the content that the user is shown in the future on the user interface.

The recommendation engine thus preferably identifies and uses a user's subscriptions, e.g. twitter, rss and tumblr, and other data sources as noted. It examines each piece of content published by these subscriptions, and scrapes them for hyperlinks. These hyperlinks are then scored by the algorithm, and the top scoring links (with some accompanying description preferably) are presented to the end user.

The user is presented with a preferred interface shown in FIG. 5 containing the scored links 500. The end user can then preferably "contextualize" the link, such as by adding tags 505 or comments 510 around the link, and attaching pictures 515, video 520, or quotes 525 that are appropriate to the link. Other forms of contextualizing will be apparent to skilled artisans. The end user can then publish this contextualized link to any number of content sources 530, e.g. twitter, tumblr, or custom blogs with wordpress 535. The end user may also choose to delete a link that is presented to them at 540.

Figure 6:
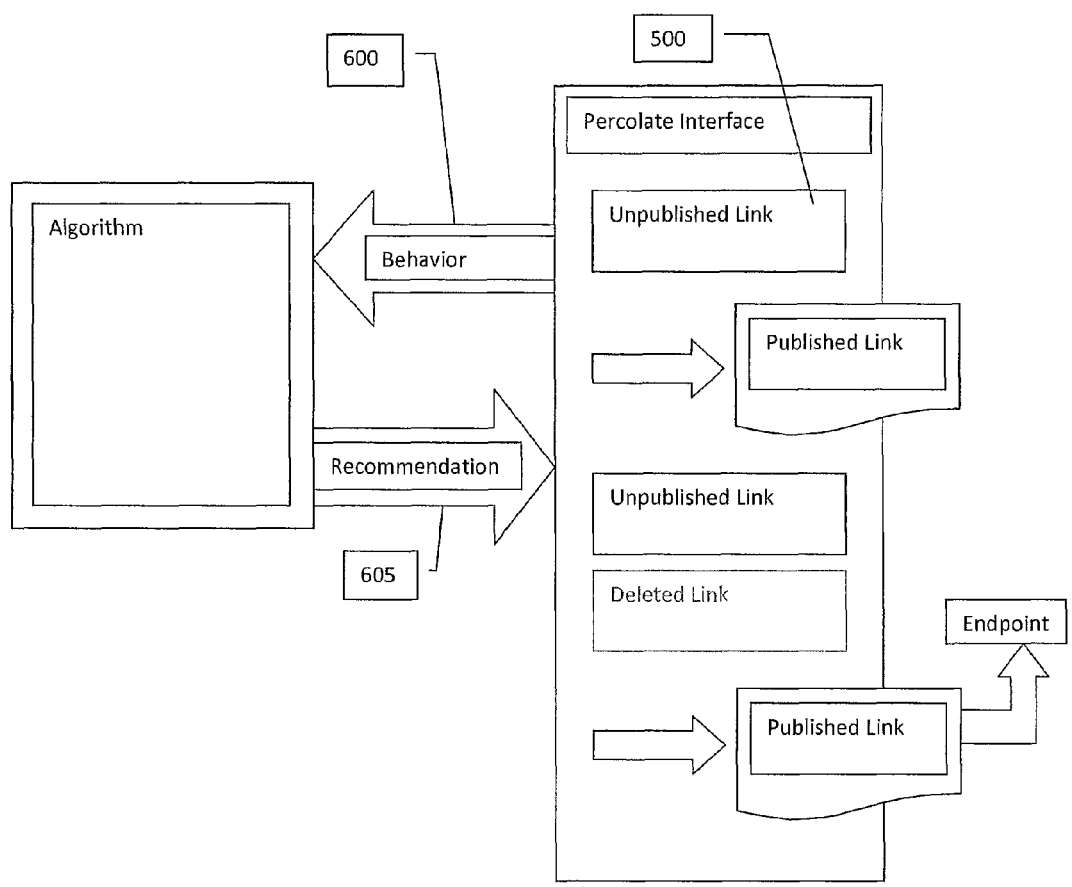
FIG. 6 is a block diagram illustrating a feedback loop.
Figure 7:
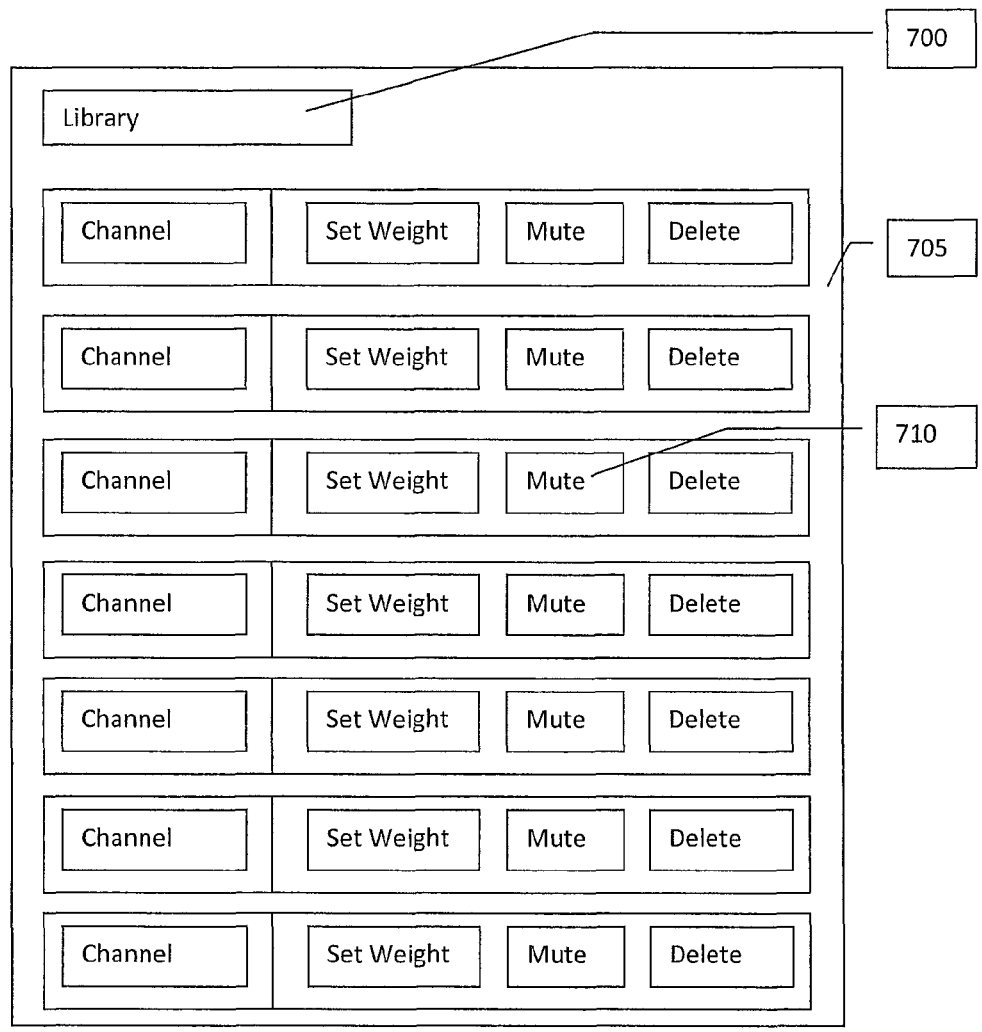
FIG. 7 is an example of a user interface for presenting explicit feedback through assigning weights to sources.

FIG. 6 is a diagram of the feedback from the interface which can be exploited in the present applications. The user actions are fed back into the algorithm to affect what links are shown at a next session 600. For example, if a user posts about a link, system 100 infers that they want to see more content like it. If they delete a link, the system infers the opposite. This form of implicit feedback can also be used to affect the type of content that is recommended at 605.

In another embodiment, feedback from the user, after the links have been published, can be fed into the channel system for later use. For example, if positive feed back is obtained for a link in a particular channel, then more links from that particular channel will be recommended for the user.

The end user also preferably has a library page where they can give explicit feedback 700. The library page contains all of the user's subscriptions 705. Each subscription is assigned a weight that indicates a user's interest in the content source. Each source is given a default weight which is assigned to each source manually by an administrator. The user then has the option of weighting down, weighting up, and muting their sources 710 based on their preferences. By weighting down or weighting up the content source, the content items displayed to the user from the source can be decreased or increased. By muting the source, no content items will be displayed from the source.

Pre-Processing of Content

Accordingly in the preferred process, a similarity score is determined for two or more pieces of internet content based on their respective text of the content. This task is made more difficult by the fractured and colloquial nature of much of the content on the Internet. Again to improve an overall comparison throughput rate, preferred embodiments of the present disclosure seek to avoid the processing difficulties and latencies associated with a traditional full semantic word-by-word analysis by instead breaking/assigning the words in a string into one or more predefined classes.

Figure 8:
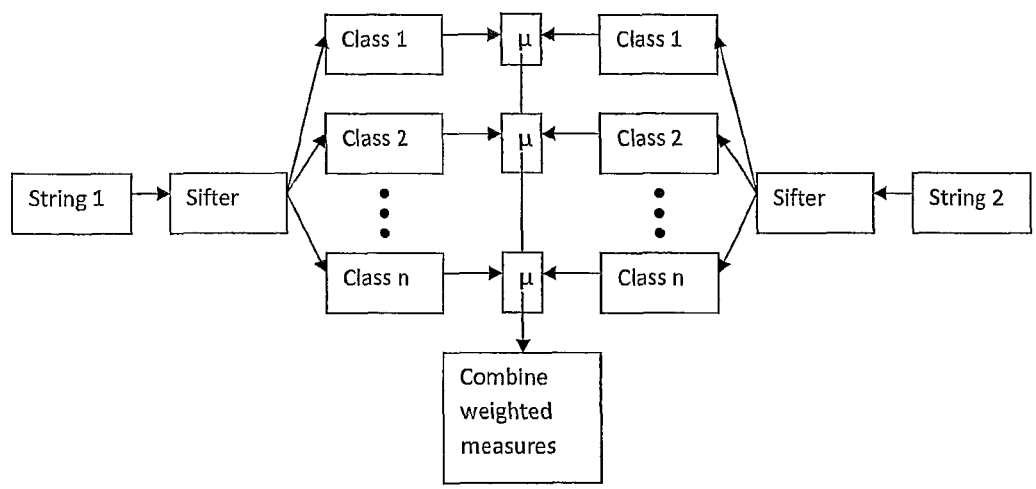
FIG. 8 is an example of a content similarity comparator.

A preferred embodiment of an automated document comparator is illustrated in FIG. 8. As noted above, this comparator creates a similarity score which determines a likelihood that two documents are covering the same topic based only on the headlines of the documents.

Each headline (String 1, String 2) is preferably broken down by a sifter routine into a vector containing its constituent words and in some instances word phrases. In some cases it may be desirable to filter or discard "noise words", or low information words at this point in the process to reduce later low value comparison operations.

Each word is then classified by a classifier routine based on a predetermined scheme of classes (Class 1, 2 ... n) which can take any number of forms and be customized or tailored for a particular application based on operational and performance requirements. For example, one scheme could separate nouns from verbs and from other parts of speech, or separate commonly found words from rare words, or subjects of a sentence from other parts, or proper English words from non-English words that are often the subject in a headline (as names, company names, and places are often not English words).

In a preferred embodiment, the sifter routine separates the strings into very common English words, English words, and non-English words.

A similarity measure is then performed on the words falling in each class using any well-known scoring technique such as (e.g. Pearson, Tanimono). If computation time allows and it is desirable to increase a scope of the matching process, semantic matching can be employed as well in some embodiments. Finally the n class similarities can be weighted and combined to give a final similarity score or measure.

A simple exemplary implementation would consist of classifying words as belonging to standard English or not belonging to standard English. The class with non-standard English words is weighted to be twice as important at the class containing English words. The words in each headline are separated into appropriate classes, and then in one implementation compared using the Jaccard similarity coefficient. The Jaccard similarity coefficient in this case given by $$J(A, B) = \frac{|A \cap B|}{|A \cup B|}$$

Consider 3 headlines:

a) Samsung introduces the Galaxy phone.

b) Hubble captures new image of spiral galaxy.

c) The Galaxy is the newest entry from Samsung.

Let E=stemmed English without stopwords, and NE=non-English. Headline 1 is separated into two sets, 1E={introduce, galaxy, phone} and 1NE={Samsung}. Headline 2 is separated into 2E={capture, new, image, spiral, galaxy} and 2NE={Hubble}. Headline 3 is separated into 3E={galaxy, new, entry} and 3NE={Samsung}. So:

$$\text{Compare}(1,2) = J(1E, 2E) + 2*J(1NE, 2NE) = 1/7 + 2*0 = 0.143$$

$$\text{Compare}(1,3) = J(1E, 3E) + 2*J(1NE, 3NE) = 1/5 + 2*1 = 2.2$$

$$\text{Compare}(2,3) = J(2E, 3E) + 2*J(2NE, 3NE) = 2/6 + 2*0 = 0.333$$

The cutoff for similarity is set to 1.5, so 1 and 3 are similar, but neither 1 and 2 nor 1 and 3 are similar.

The claimed process can be tuned at different levels to adjust the overall similarity scoring behavior. For example, a bias towards can be implemented by using more relaxed matching comparisons or with fewer class comparisons, so that stories with less apparent content overlap are nonetheless scored high enough to be considered the same, as to reduce or avoid duplication of content. Conversely stricter scoring tests could be used to reduce the number of items considered to be duplicates, thus resulting in an increased content corpus. The specific scoring technique again can be customized for any particular environment and performance requirement.

In preferred embodiments of the present application, the scoring preferably discards the similarity measure of very common words, moderately weights the similarity measure of stemmed English words, and heavily weights the similarity measure of non-English words. This ensures that a very fast, high level screening can be done for relevant content without excessive duplication.

A binary measure is preferably applied to determine if the headlines are likely to be about the same subject. Again other scales or ranges could be used to score and assess a similarity between two documents.

Finally the preferred method also uses a cutoff or threshold determined from training data which is periodically refined to improve a classification accuracy. The thresholds can also be programmed as desired to achieve a particular target performance accuracy, speed.

The comparator is preferably implemented on a computing system (which may include one or more separate interconnected devices, servers, etc.) and is constructed of a number of automated computing routines. These routines can be implemented using any one of many known programming languages suitable for creating applications that can run on large scale computing systems, including servers connected to a network (such as the Internet). Such applications are embodied in tangible, machine readable form for causing a computing system to execute appropriate operations in accordance with the present teachings. The details of the specific implementation of the present application will vary depending on the programming language(s) used to embody the above principles, and are not material to an understanding of the present application.

Figure 11:
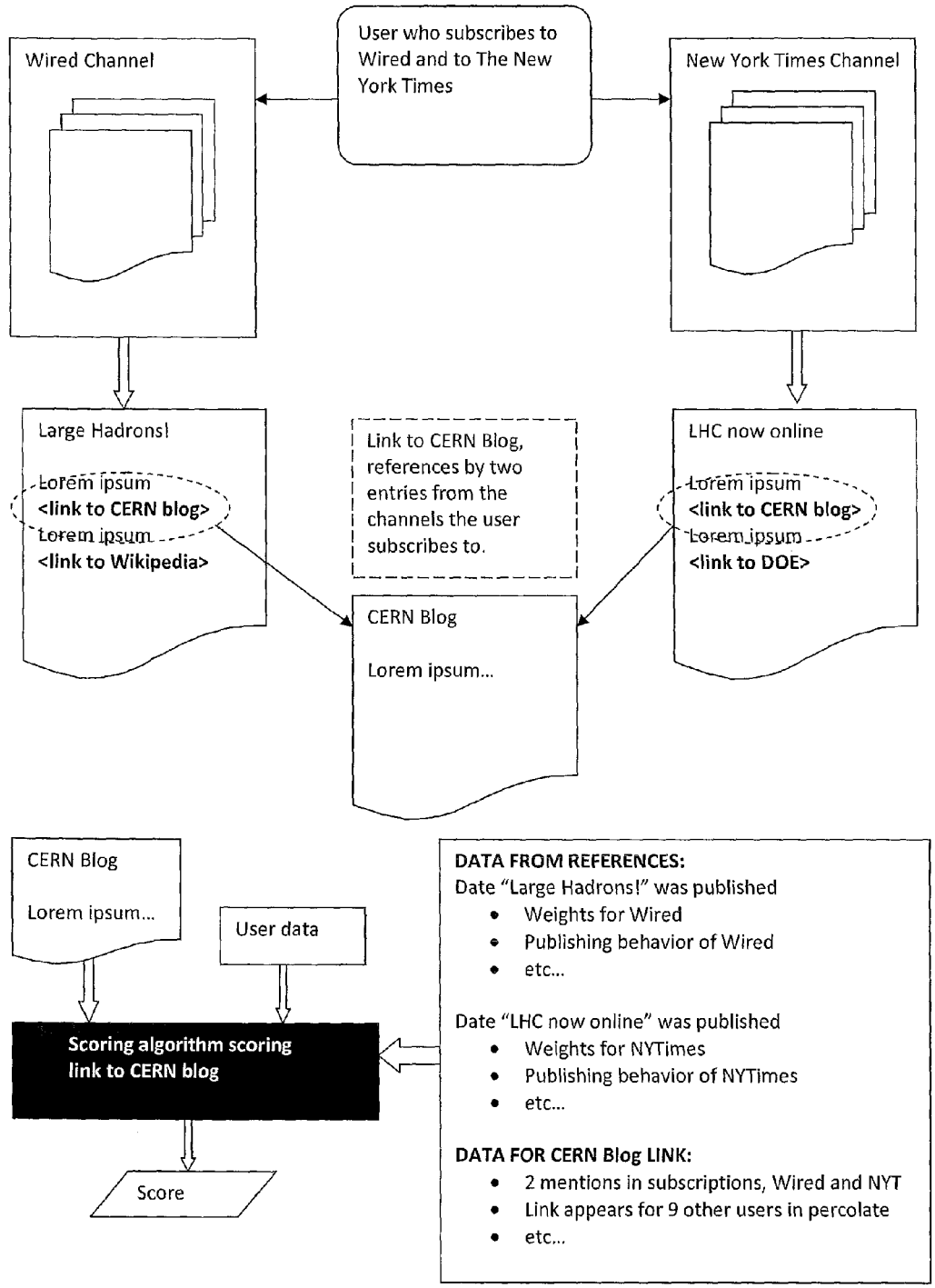
FIG. 11 is an example of a content scoring system.

An embodiment of an automated document comparator is illustrated in FIG. 11. This comparator creates a similarity score which identifies a content comparison between two documents.

A typical prior art technique for comparing n data items typically requires something on the order of $n^2$ comparisons. This is undesirable from a performance perspective because the number of items in a document for example is unpredictable and the time required would be prohibitive. The preferred embodiment makes use of a constant-time lookup of hash tables to reduce the run time of comparing n things pairwise. The present teachings can be used for comparing content in electronic documents such as found in a blog, a news story, a webpage, a posting, or other similar starting material.

Preferred embodiments of the present application seek to reduce the undesirable $n^2$ processing time by reducing a number of comparisons to be made. Similar to a mapReduce framework, a hash table is constructed, keyed off of features important to the comparison. The values stored in the table correspond to the items that contain those features. For each feature, pairwise comparisons are run for the items, making use of a second hash table to make sure that duplicate comparisons are not made. In this approach, the number of comparisons is reduced because it is based more on a feature count as opposed to an item-to-item comparison.

Figure 9:
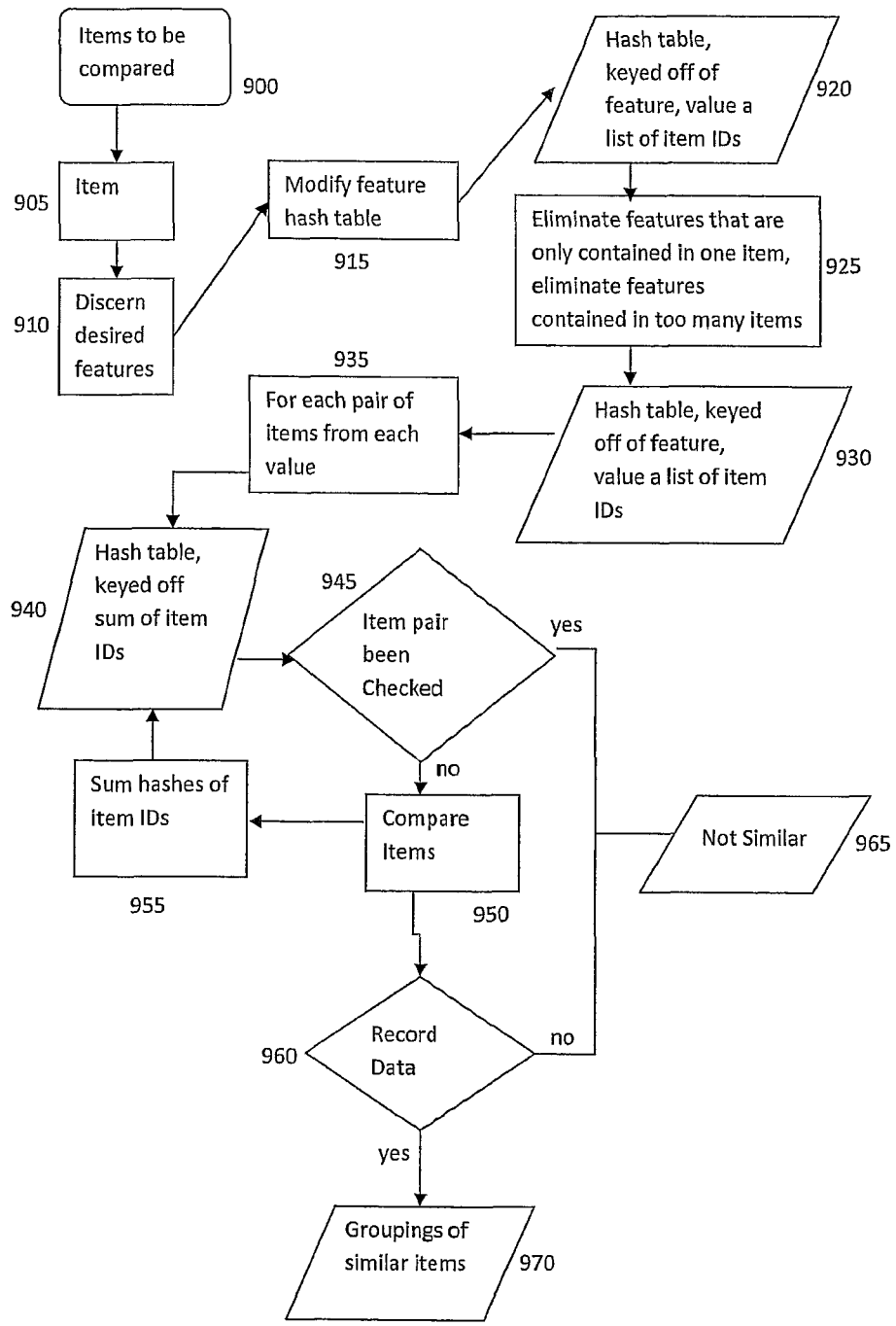
FIG. 9 is a block diagram of a content item comparator.

FIG. 9 illustrates a preferred embodiment in which n sentences in a set of documents are compared to one another to see how many words they have in common. In a preferred embodiment, the sentences represent headlines or excerpts from online published stories. In a scheme similar to mapReduce, each sentence is broken down and modifications are made to features in a hash table. The hash table features for the items can then be compared rapidly to determine a content overlap score.

In 900 the collection of items to be compared is entered, leaving us with the items 1105. The items are processed 910 so that important features are extracted and normalized (e.g. in the case of words, stemmed and make lowercase). In 915, for each feature (word) in a item (headline) the item id is appended to the values for the feature, yielding the feature hash table 920. In 925 key-value pairs are eliminated for having a value with one item (nothing to compare to) or too many items (too large a group to be of interest) leaving a feature hash table where the items should be compared 930. For each pair of items in each value 1035, hash the pair or the ids of the pair to make a key for the second hash table 1040. Check if the key is in the hash table 945. If yes, the two items have been compared already and no further action is needed 965. Go to the next pair from 935. If no, compare the items 1050. Hash the pair or the ids of the pair and add it as a key to the hash table of items already compared 1055. Go to record data 960. If the data meets the criteria for acceptability, record it 970. Go to the next pair from 935. If not, no further action is needed 965. Go to the next pair from 935.

To do this, the items (sentences) to be compared are preferably first identified. For each sentence (S1, S2 . . . Sn), punctuation is stripped and the sentence is broken down preferably into features (words). For each word (W1, W2 . . . Wm) in a sentence Sn, if the word already exists as a key in the hash table an id of the sentence is preferably appended to a set of values for that key. If the word is not already a key in the hash table, that word is added as a key and the sentence id is stored as a value. Other techniques for creating the hash table will be apparent to those skilled in the art.

For each key in the hash table, if the number of ids stored at that key is only one the key-value pair preferably is deleted. This represents a case where only a single item (sentence) has the feature in question, and thus is not a useful comparison item. Similarly in instances where certain features are contained in too many items, this is also less likely to yield a useful comparison, so these keys preferably can be eliminated as well. It will be appreciated that the determination of what threshold to be used for determining an excess number of common features can be done through routine experimentation, and is expected to vary based on domain content and a desired performance speed, accuracy tradeoff. Other techniques for pruning the hash table to improve performance can be incorporated as well.

For each remaining key in the hash table, the sentences stored at that key are preferably compared pairwise. For each combination of sentences, before the sentences are compared, the sentence ids are preferably hashed and summed (or concatenated). An entry corresponding to this sum is then preferably checked for in a second hash table. If the sum is there already there, the process moves to the next combination of sentences. If the sum is not yet in the second hash table, the sentences are compared. Again other methodologies known in the art can be employed as well.

If the result of the comparison yields a score worth recording the result is recorded. The threshold for identifying a sufficiently matched comparison can be adjusted as desired. After this step the sentence ids preferably are hashed and summed (or concatenated) and added to the second hash table. The second hash table ensures that duplicate comparisons are not made.

Consider in one implementation the feature hash table and the comparison hash table as follows. The keys in the feature hash table are words, the values are lists of headline ids for headlines that contained the word. The comparison hash table has keys that are headline id concatenations and values of 1 for checked.

| Feature Hash Table | | Comparison Hash Table | |
|---|---|---|---|
| "apple" | 1, 2, 3 | "1__2" | 1 |
| "banana" | 1, 4 | "1__4" | 1 |
| "orange" | 1, 3 | | |

There are three headlines with the feature "apple". So comparisons are to be conducted for 1 and 2, 2 and 3, and 1 and 3. "1__2" is in the comparison table, so we have already processed this pair, and don't need to do it again. "2__3" and "1__3" are not in the table, so these two headline comparisons are done and these two keys are added to the comparison hash table. There are no more comparisons so we move to the next feature. The feature "banana" has us compare 1 and 4, but "1__4" is in the hash table so we move to the next feature. The feature "orange" has us compare 1 and 3, but we added "1__3" to the comparison hash table when we did this exact comparison for "apple", so there is no need to do it again, and move to the next feature.

The look up time for checking entries in the second hash table is constant, which is a further advantage of the present approach. The careful selection of features that trigger a lookup can reduce the size of the first hash table and significantly improve run time compared to prior art techniques.

The present application is described in the following Examples, which are set forth to aid in the understanding of the application, and should not be construed to limit in any way the scope of the application as defined in the claims which follow thereafter.

Scoring Algorithm:

For a given link that is found in a piece of content, the recommendation system 114 looks at how many sources published content that also hyperlinked to this particular link. The recommendation system incorporates the weightings of each of these sources, which may have been adjusted either implicitly or explicitly as described above. Other information about these sources, such as how often they publish, can also be considered, along with other authority, reputation or similar data. The system also preferably looks at properties of the actual link; for instance, when it was published and if there are any pictures or videos in it. Furthermore the system can also consider or predict how likely it is that other people have seen this link.

Figure 10:
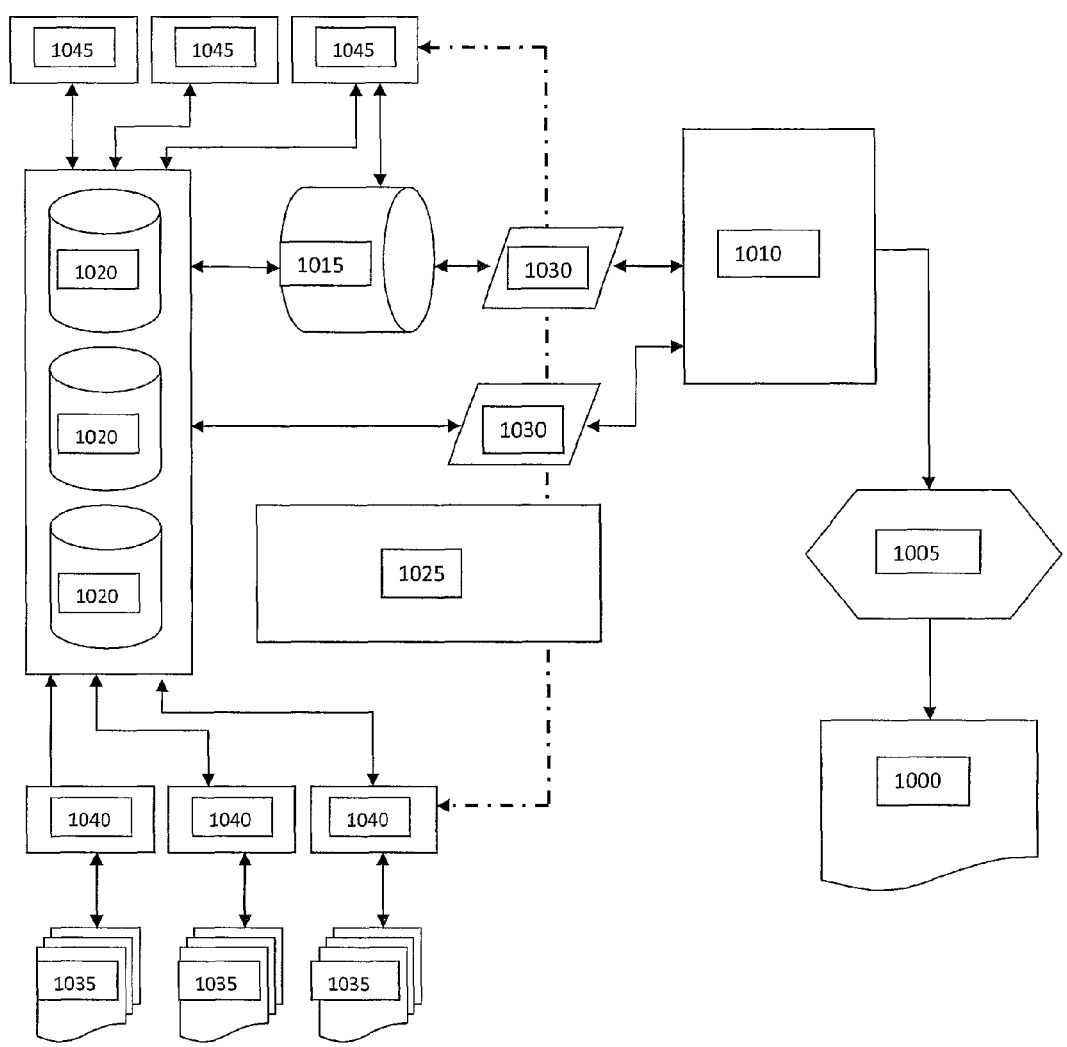
FIG. 10 is a block diagram illustrating a generic hardware diagram of the content scoring system.

FIG. 10 illustrates a generic hardware diagram of the content scoring system. A cluster of scrape servers 1040 scrape web content 1035 from channels in the recommendation system database(s) 1020. These servers are managed by a messaging system 1025. The scrape servers 1040 parse the web content and all relevant data about that content and write it to the database(s) 1020. The scoring of this content is done by a cluster of score servers 1045 managed by a messaging system 1025. The score servers read data from and write data to the database(s) 1020 and to cached memory servers 1015. The recommendation system application server 1010 receives data from disk 1020 and cached memory 1015. The page is rendered 1005 and the recommendation system homepage 1010 is presented to the user. Again it will be understood that other hardware architectures can be used in lieu of the above, which is intended merely to be exemplary.

An additional example is illustrated in FIG. 11. A user here subscribes to Wired and New York Times. These are two subscriptions. Wired publishes a first story about a the Large Hadron collider (LHC) that contains separate links to a CERN blog post about the LHC, an earlier wired article, and Wikipedia's LHC entry. The New York Times publishes a second story about the same topic—the LHC—that includes a separate set of links including one to same CERN blog post about the LHC, and another for the Department of Energy.

The recommendation system 114 scrapes the two stories, and looks at the content pointed to by the links in the stories. Consider the link to the CERN blog entry. This is a link the system may recommend, because, among other things, it was mentioned by two of the user's sources. In addition, as noted earlier, the system looks up and considers any user-specific weightings of Wired and The New York Times they have provided, as well as other authority/rank/reputation information that may be available about these sources. Other factors could be considered of course.

The system further looks at when the CERN blog entry was published, and considers other pieces of information about this link. The CERN blog entry is then scored, and if its score is high enough it is presented to the user as well.

If the user chooses to interact with this link, that interaction is recorded and can be considered next time a link is scored for them. This consideration will be accomplished by adjusting user-specific parameters.

What is claimed is:

1. A computer implemented method for recommending content to a community of users comprising:
   identifying, using at least one computing device, a plurality of data sources associated with a plurality of users, wherein each data source comprises at least one content item;
   compiling the content items from the plurality of data sources to for a set of first content items;
   extracting using the at least one computing device, a set of first identifying data from the set of first content items;
   identifying, using at least one computing device, at least one data source associated with a first user, the data sources comprising a set of second content items;
   extracting, using the at least one computing device, a set of second identifying data from the set of first content items;
   determining a similarity score between the content items in the first set of content items and the second set of content items, wherein the similarity score is based on the identifying data associated with the content items;
   identifying, using the at least one computing device, a set of third content items, the third set of content items comprise content items from the first set of content items and the second set of content items with a similarity score exceeding a pre-determined threshold;
   receiving a set of preference parameters from the first user;
   determining an algorithmic score for each content item in the set of third content items, the algorithmic score being based on the set of first identifying data and the set of preference parameters;
   generating a set of ranked content items from the set of third content items, wherein the ranking is based on the algorithmic scores of the content items; and
   presenting the set of ranked content items to the first user.

2. The method of claim 1, wherein the identifying data comprises identifying at least one of a hyperlink, a hashtag, and a key word.

3. The method of claim 1, wherein the preference parameters comprise at least one of: a user preference, a publishing behavior with regard to a data source, source popularity and an age of a hyperlink.

4. The method of claim 3, wherein the user preference is an interest theme.

5. The method of claim 4, wherein the interest theme is determined by an input to at least one of a survey and questionnaire from the first user.

6. The method of claim 1, wherein a subset of the set of ranked content items are presented to the user.

7. The method of claim 1, wherein presenting the set of ranked content items to the first user further comprises presenting the set of ranked content items and at least one of: a hyperlink to the ranked content items with context and a category or media associated with the ranked content items.

8. The method of claim 1, comprising monitoring user interactions with the ranked content items.

9. The method of claim 8, further comprising adjusting a weight assigned to the ranked content item based on the monitored user interactions.

10. The method of claim 8, wherein the monitored user interactions are fed back into a scoring algorithm to affect content items that are shown to the user at a next session.

11. The method of claim 10, wherein a positive feedback regarding the ranked content item allows for more content to be presented from the data source comprising the ranked content.

12. The method of claim 1, wherein determining a similarity score further comprises:
   processing a first content string from a first document to identify a first set of one or more words associated with said first content string;
   processing a second content string from a second document to identify a second set of one or more words associated with said second content string;
   defining a reference set of classes for classifying words from said first content string and second content string;
   classifying both said first set of one or more word and said second set of one or more words into a first set of classes and a second set of classes respectively taken from said reference set of classes;
   computing a first class similarity score using a comparator by comparing words from said first set of one or more words and said second set of one or more words which fall in a common first class in said reference set of classes;
   computing a second class similarity score for any other words from said first set of one or more words and said second set of one or more words which fall in a second separate common class to determine a plurality of common class similarity scores;

weighting said common class similarity scores based on a predetermined class weight score;

computing a final similarity score between said first content string and said second content string based on summing said weighted common class similarity scores;

wherein only a subsample of content from said first document and said second document are used to derive said final similarity score.

13. The method of claim 12 wherein the subsample is a headline provided for a news story.

14. The method of claim 12 wherein said first set of classes and second set of classes correspond to English and non-English words.

15. The method of claim 12 further comprises:

processing n content strings from a plurality of document to identify a corresponding set of words associated with each of said plurality of content strings;

defining a set of m keys in a hashtable based on combining all of said set of words for said n content strings, wherein a key is created in said hashtable for each word in said combined set of words and each key, and each key is associated with one or more content string identification codes;

reducing said hashtable by eliminating a selected number (s) of keys based on a count of said identification codes;

comparing m-s keys remaining in said hashtable to compute sums for each combination of sentences found in said m-s keys;

storing any of said sums of combinations of sentences which meet or exceed a predetermined threshold in a second hashtable.

16. The method of claim 15 further including a step: sorting said sums to identify a pair of said n content strings having a greatest similarity score.

17. The method of claim 15, further including the steps:

specifying a first content string as a reference string comprised of a reference set of words;

performing a document search with a search engine query based on said reference set of words to identify an initial candidate set of documents containing said n content strings;

processing each of said initial candidate set of documents to identify a highest ranking document having a similarity score closest to said first content string.

* * * * *